United States Patent [19]

Rigotti et al.

[11] Patent Number: 5,060,095
[45] Date of Patent: Oct. 22, 1991

[54] HEAD-DISK ENCLOSURE ASSEMBLY FOR A MAGNETIC DISK STORAGE DEVICE

[75] Inventors: James M. Rigotti, Rochester; Lyle R. Tufty, Elgin; Michael N. Zell, Rochester, all of Minn.

[73] Assignee: International Business Machines Corporation, Armonk, N.Y.

[21] Appl. No.: 305,236

[22] Filed: Jan. 31, 1989

[51] Int. Cl.$^5$ .............................................. G11B 17/02
[52] U.S. Cl. ............................... 360/98.01; 360/97.03
[58] Field of Search .......................... 360/97.03, 98.01

[56] References Cited

U.S. PATENT DOCUMENTS 4,714,972 12/1987 Biermeier et al. ............... 360/97.03
4,743,995 5/1988 Castle et al. .......................... 360/98

Primary Examiner—Robert S. Tupper
Attorney, Agent, or Firm—Robert W. Lahtinen

[57] ABSTRACT

A disk drive structure is shown which maximizes the axial length available for mounting disks within a predetermined height such as dictated by a form factor. A cast aluminum box frame is used which supports the spindle and actuator assemblies and forms a part of the head disk enclosure in cooperation with a drawn metal cover. The box frame captures the spindle and actuator shafts at each end to ensure maximum overall assembly stiffness and minimize the axial length required by the structure supporting the spindle. The box casting geometry is angled to establish the casting/cover joint region at a location beyond the zone of tangency of the disks nearest the form factor so that only the thinner cover is interposed in the region where the disks most closely approach the form factor. The cover and box frame are sealed and secured to one another by a thin compliant tape that does not contribute stress to the box frame during thermal cycling.

9 Claims, 2 Drawing Sheets

HEAD-DISK ENCLOSURE ASSEMBLY FOR A MAGNETIC DISK STORAGE DEVICE

FIELD OF THE INVENTION

This invention relates to rigid magnetic disk storage devices and more particularly to a rigid disk drive structure that optimizes volumetric storage density within a form factor height dimension by maximizing the axial length of the space available for mounting disks.

BACKGROUND

Magnetic disk drives are designed to attain ever increasing storage capacities while continuing to meet a rigid standard of error free operation and reliability. In addition, this must be accomplished within the constraints of the form factor for the disk size in use. The form factor is the limitation or standard that is recognized in the industry for the drive length, width and height. This standard, in practice, has been a defacto standard usually set by the dimensions selected for a flexible disk drive that is subsequently replaced by a hard disk drive. The hard disk file must fit into the same space occupied by the flexible disk drive and thus the dimensions are established, more by circumstance than by design.

In view of the size constraints, the only way in which the storage capacity can be increased is through an increase of the volumetric density of the drive. The combination of high areal density on the individual disk surface along with maximized disk density within the device envelope establish the potential for providing maximum storage within the drive.

SUMMARY OF THE INVENTION

To provide for the maximum height or axial distance allowance for storage disks and provide adequate structural stiffness, the design of the present invention uses a cast aluminum box frame to support and partially enclose the spindle shaft, the actuator shaft and the voice coil motor stator portions such as the core elements. This cast box design, with encircling top, bottom and side walls makes the most efficient use of the structural space in the vertical or Z axis direction. The top surface of the casting is placed at the extreme upper limit of the form factor, while the bottom surface is at the bottom of the device form factor less the minimum allowable sway space to allow for shock displacement. This approach, with only a single structural element at top and bottom permits maximized theoretical space for disks and actuator arms. The remainder of the structural enclosure consists of a spindle cover and voice coil motor end cap.

The voice coil motor (VCM) end cap is also a casting and attaches to the box casting by means of four screws serving both to enclose the end and improve the stiffness of the box casting. The spindle cover is fabricated as a deep drawn aluminum element and is secured to the box casting by means of a band of thin compliant tape. The tape affords a seal with minimum thickness (limited increase in the height and width dimensions) and does not distort the box casting. To ensure maximum overall assembly stiffness, the spindle, actuator pivot points and VCM pole pieces are secured with shoulder screws to the bottom box casting wall and are further secured by means of noninfluencing fasteners to the top box casting wall as taught in the copending U.S. patent application, assigned to the same assignee. This method of attachment, with both ends secured, enhances the transverse stiffness of the members and ensures a stable set of relationships for parallelism between the spindle axis and the actuator swing arm axis once established during assembly. The long term stability of the parallel relationship is of major importance in preserving data integrity by avoiding excessive track misregistration (TMR) due to relative movements which could cause information recorded on the disk tracks to be no longer recoverable by the read/write head.

DETAILED DESCRIPTION

Figure 1:
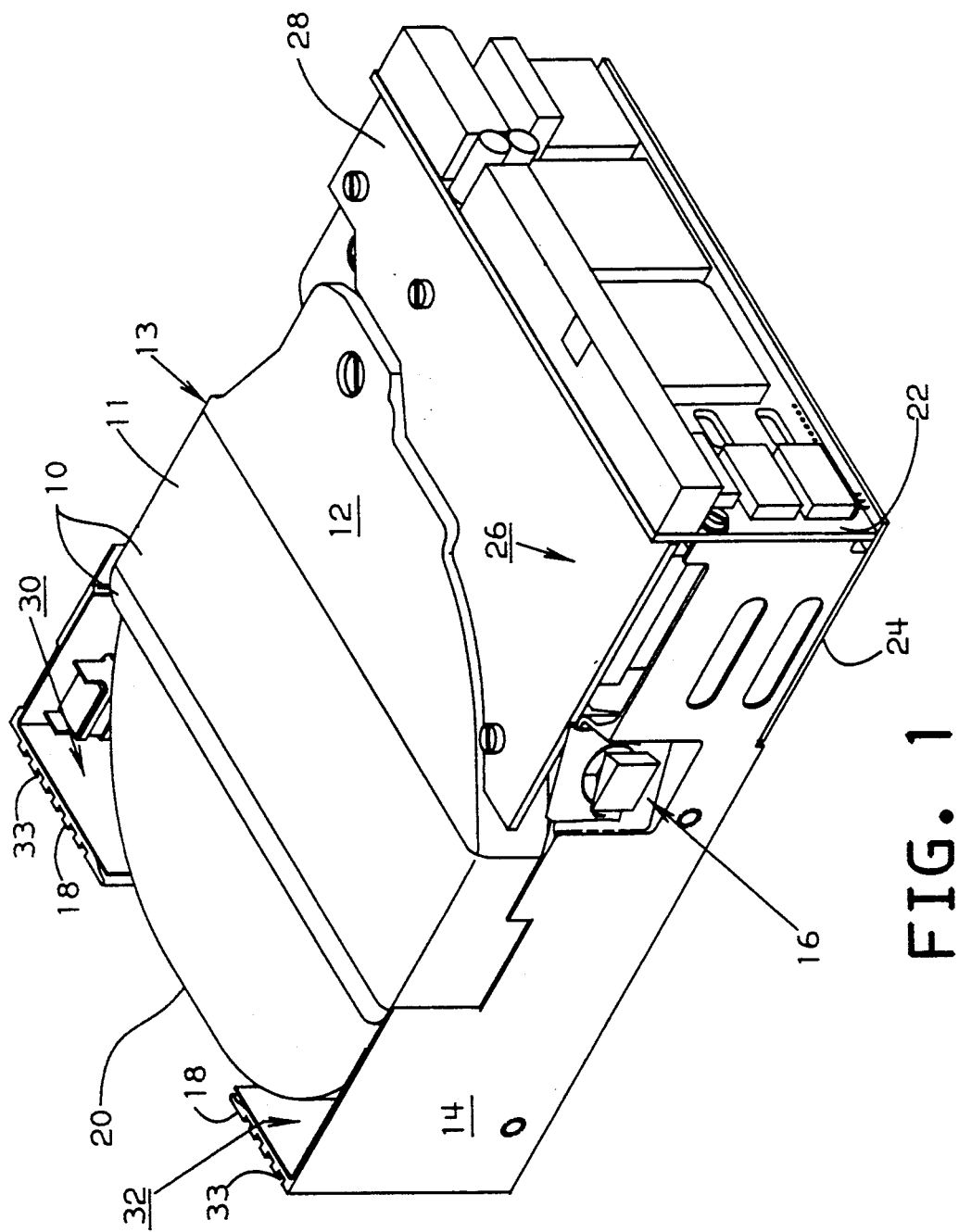
FIG. 1 is an isometric view of an assembled disk drive incorporating the head disk enclosure structure of the present invention.

Referring to the drawing, FIG. 1 is a completely assembled disk drive illustrating the preferred embodiment of the invention. The disk drive cast body 12 is shock mounted in frame 14 by three shock mounts 16 (one of which is shown). The disk stack is dust sealed by cover 10 which is secured and sealed to body 12 by a band of thin tape 11. The sealed enclosure formed by the cast body 12, cover 20 and sealing tape 11 serves to enclose and seal the disk and actuator assemblies to form a head-disk assembly (HDA) 13. The body 12 portion which overlies the disks and transducer mounting structure fills the vertical height of the disk drive assembly and the disk drive form factor height dimension, except for sufficient clearance to permit passage of the flat cable connected to the motor driver circuits and accommodate the the vertical sway associated with the shock mounting. The frame front wall 18 is cut away to allow the front surface 20 of disk stack cover 10 to approach the forwardmost limit of the form factor length dimension.

The electronics for the drive, which are positioned outside the HDA 13, are attached to the back of frame 14 and packed into the corners between the HDA 13 and frame 14. The bus interface electronics are printed on circuit card 22 attached to the back wall of frame 14. The data channel and servo circuits are on a micro card 24 attached at the rear bottom of frame 14 (only the edges of which are visible in FIG. 1), a stack of cards in the corner 26 of the drive and a data channel card 28 mounted at the rear top of frame 14. The spindle motor drive circuits are mounted on a flex cable folded and bonded to the inner walls of frame 14 in the corner 30. The voice coil motor drive circuits for the actuator are also mounted on a flex cable folded and bonded to the inner walls of frame 14 in corner 32. The frame front wall 18 also has grooves 33 to provide an extended surface for dissipation of heat from the motor drive circuitry secured to the inner surface of wall 18.

Figure 2:
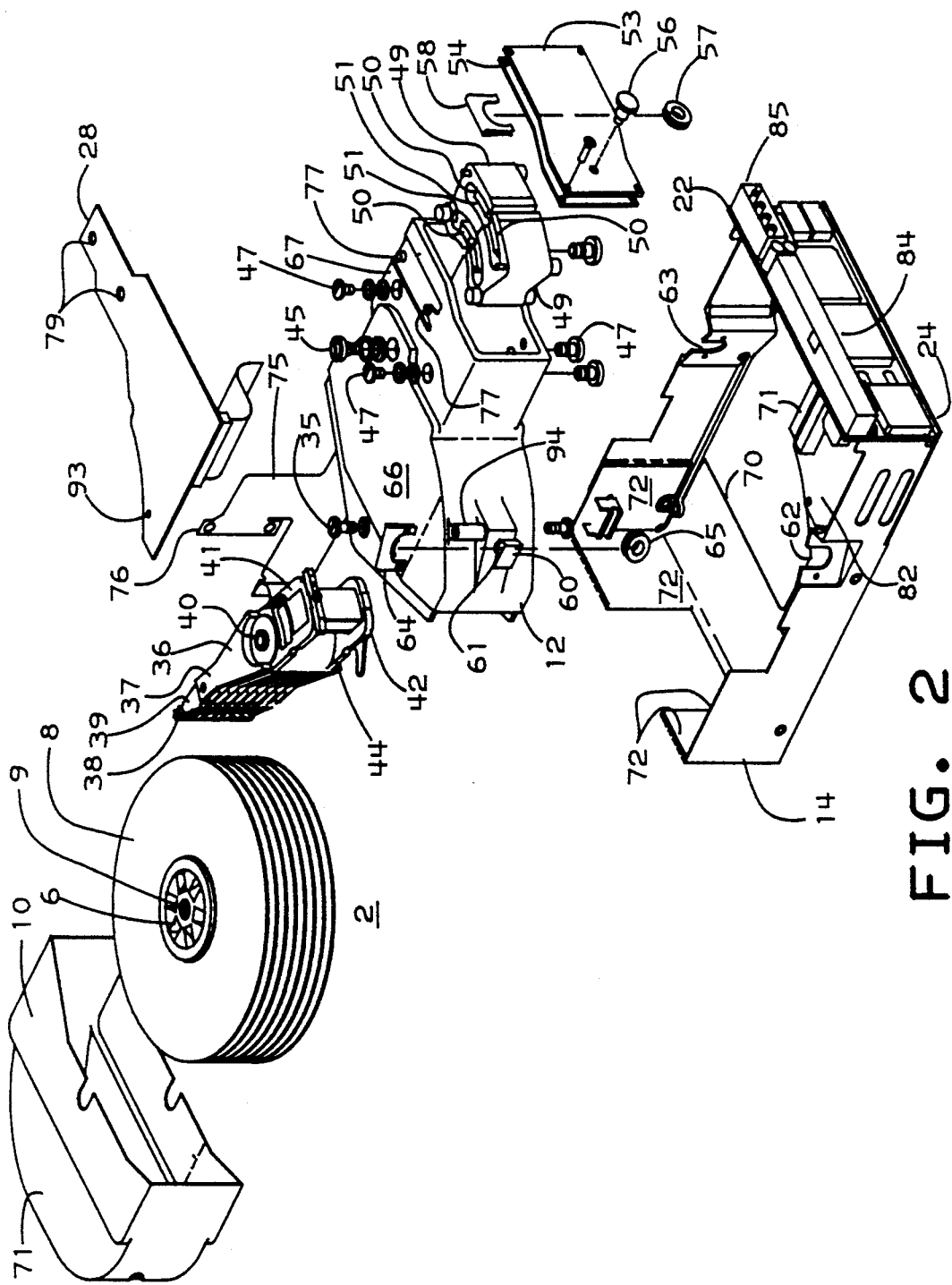
FIG. 2 is an exploded view of the disk drive of FIG. 1 showing the detail of the head disk assembly and enclosure.

FIG. 2 shows the organization of the mechanical and electrical elements within the form factor and mounted on frame 14. The disks 8 are mounted about a hub 6 which contains the spindle drive motor (not shown). The spindle shaft 9, which forms a part of the wound stator of the spindle drive motor, is secured at each end to the body 12 by bolts 35 (one of which is shown). The actuator body 36 has a comb portion that presents a series of arms 37. The upper and lower arms 37 carry a single transducer 38 and resilient suspension 39 which respectively confront the uppermost and lowermost data surfaces of the stack of disks 8 while each intermediate arm that extends between confronting disk surfaces carries two transducer/suspension assemblies respectively confronting the data surfaces facing the supporting arm. At the opposite side of the shaft 40, about which the body 36 pivots, projections 41, 42 support a voice coil motor coil 44. The actuator shaft 40 is secured to body 12 by an upper bolt 45 and a similar lower bolt which is not visible. Also mounted on body 12 by a series of bolts 47 are a pair of voice coil motor core elements 49 in the form of members having an E shaped cross section which abut one another and which have permanent magnets 50 attached thereto. This core assembly provides an air gap 51 across which a magnetic field is maintained and in which the vertically extending stretches of the voice coil 44 are positioned. A cover 53 and gasket 54 are secured to the open end of body 12 to cover and seal the end.

A shock mount pin 56 is mounted on cover 53. The shank portion of pin 56 is surrounded by an elastomer ring 57 and received in a U-shaped recess (not visible) in the back wall of frame 14 and retained therein by a clip 58. Body 12 projection 60 includes a shank 61 which is surrounded by an elastomer ring 65, received in U-shaped frame recess 62 and retained therein by clip 54. A similar shock mount assembly, carried by body 12, is received in frame 14 U-shaped recess 63.

The maximum height of body 12 extends from surface 66 to the corresponding bottom surface. This vertical dimension uses the total height available within the form factor vertical dimension less the thickness of the flex cable 70 and the vertical sway space required by the shock mounting. The casting end portion 67, which houses the actuator voice coil motor assembly, has a reduced height to permit micro card 24 to extend below and data channel card 28 to extend thereover. It will be noted that the side walls of box frame 12 do not extend to a position adjacent both ends of a disk diameter. In particular, the box frame side walls do not extend between the disks 8 and frame 14 at either end of a diameter that is perpendicular to the frame 14 side walls. Accordingly, the thickness of box frame 12 is not interposed between frame 14 and disks 8 at the closest approach to the form factor width and the only enclosure portions present at this minimum clearance position are the cover 10 and the thin compliant tape 11 that seals cover 10 to box frame 12. Cover 10 includes a reduced height portion 71 over the disk stack where it is not necessary to enclose a transducer suspension assembly in addition to the disk stack. Flex cable 70 extends from micro card 24 and has folded portions 72 which are adhered to the inner wall surfaces of frame 14. The motor driver circuits, which require greatest heat dissipation, are mounted at the interior of rear wall 18 that is provided with an extended heat transfer surface by grooves 33. The motor driver circuits are also isolated from the most thermally sensitive portions of the device structure and electronics.

The actuator data channel and servo electronics are connected by a flat cable which connects the the transducer coils to the drive electronics outside the HDA 13. Terminations at cable end 76 (which attaches to body 12 about pins 77) are connected to a connector mounted at the lower surface of data card 26 through openings 79. The end of cable 75, which is obscured by the body 12 in the exploded view, attaches to connector 81 on the card 82. Card 82 is mounted between micro card 24 and data card 28 in the frame corner 26. The interface card 22 that is mounted to the rear wall of frame 14, includes an interface connector 84 that interchanges data and control signals with the using system and a power connector through which the device receives power and the required supply voltages.

What is claimed is:

1. A magnetic disk storage device having a spindle which supports a plurality of rigid magnetic disks to form a spindle assembly for rotation of said disks about a common axis and a rotary actuator which supports magnetic transducers for movement in unison about a first axis from one data track to another data track on respective disk surfaces comprising
   a single piece box frame member including a pair of substantially parallel wall portions;
   said rotary actuator being positioned between said substantially parallel wall portions and connected respectively to said substantially parallel wall portions, each such connection being concentric with respect to said first axis;
   said spindle assembly being positioned between said substantially parallel wall portions and supported at each said wall portion by being connected concentrically with respect to the spindle axis of rotation;
   motor means for rotating said disks, said motor means being mounted about the axis of said spindle assembly and supported on said box frame;
   a cover which loosely adjoins said box frame and is sealed to said box frame member to enclose said plurality of disks, said motor and said actuator; and
   shock mounting means supporting said box frame within said storage device,
   said box frame member occupying substantially the total height of said storage device adjacent each axial end of said plurality of disks with accommodation for the downward sway space of said shock mounting means.

2. The magnetic rigid disk storage device of claim 1 wherein said actuator is a voice coil motor driven rotary actuator.

3. The magnetic rigid disk storage device of claim 2 wherein said box frame is a rigid cast member.

4. The magnetic rigid disk storage device of claim 1 wherein said frame encloses less than 180 degrees of the radial side of said disk assembly and said cover attaches to said frame at a position whereby the cover encloses the plurality of magnetic disks at a diameter that is most closely adjacent the lateral device dimension perpendicular to the spindle axis, whereby the box frame thickness is not interposed between the disks and the peripheral portion of the disks most closely proximate the device transverse or width dimension.

5. The magnetic rigid disk storage device of claim 1 wherein said box frame has an open end opposite the end enclosed by said cover that is covered and sealed by a cast cover element which is secured to said box frame, said cast cover element serving as a structural member that enhances the stiffness of said box frame member for parallelogram modes of vibration.

6. The magnetic rigid disk storage device of claim 5 wherein said rotary actuator is mounted for rotation about an actuator shaft supported between said substantially parallel wall portions and said spindle assembly includes a stationary spindle shaft about which said plurality of disks are rotatably mounted and said box frame is rigidly connected to one end of each of said spindle shaft and said actuator shaft and the end opposite said one end of said actuator shaft is connected to the box frame side wall by a connection that retains the shaft in the direction perpendicular to the axis thereof.

7. The magnetic rigid disk storage device of claim 6 wherein said motor means comprises a concentric motor within said stack of disks with a stator supported about the spindle shaft and a rotor portion, including a permanent magnet member, secured to said disk stack to rotate in unison therewith.

8. A magnetic rigid disk storage device including a disk assembly with a plurality of disks mounted on a spindle for unitary rotation, wherein all portions of the drive assembly are contained within a form factor which comprises specific predetermined dimensions for length, width and height, and wherein the height is the axial dimension in the direction of the axis about which the disk assembly rotates, comprising a one piece box frame that presents substantially parallel side walls which respectively connect to both ends of the spindle upon which the disks are supported for rotation;

motor means for rotating said disk assembly, said motor means being mounted about the axis of said disk assembly and supported on said box frame;

shock mounting means for resiliently supporting said box frame within said user frame;

a rotary actuator positioned between said substantially parallel side walls and connected respectively to said substantially parallel side walls, each such connection being concentric with respect to the axis about which said rotary actuator rotates; and electrical components mounted within said device form factor for controlling the operation of said drive and processing data to be written on or read from the disk surfaces.

9. The magnetic rigid disk storage device of claim 8 wherein said one piece box frame occupies the height of said form factor except for clearance to accommodate shock mount displacement at one axial end of the disk assembly.

* * * * *